TELEVISION TIMING SIGNAL GENERATOR

Filed Jan. 25, 1968 3 Sheets-Sheet 1

| INPUT | | OUTPUT |
|---|---|---|
| X | Y | Z |
| HIGH | LOW | LOW |
| HIGH | HIGH | LOW |
| LOW | LOW | HIGH |
| LOW | HIGH | LOW |

INVENTORS W. B. CAGLE
A. M. GORDON
BY Gerard E. Murphy
ATTORNEY

TELEVISION TIMING SIGNAL GENERATOR

Filed Jan. 25, 1968 3 Sheets-Sheet 2

Sept. 1, 1970 W. B. CAGLE ETAL 3,526,715

TELEVISION TIMING SIGNAL GENERATOR

Filed Jan. 25, 1968 3 Sheets-Sheet 3

United States Patent Office 3,526,715
Patented Sept. 1, 1970

3,526,715

TELEVISION TIMING SIGNAL GENERATOR

William B. Cagle, Colts Neck, and Alan M. Gordon, Matawan Township, Monmouth County, N.J., assignors to Bell Telephone Laboratories, Incorporated, Murray Hill and Berkeley Heights, N.J., a corporation of New York Filed Jan. 25, 1968, Ser. No. 700,590
Int. Cl. H04n 5/06
U.S. Cl. 178—69.5 9 Claims

ABSTRACT OF THE DISCLOSURE

In order to generate vertical and horizontal timing signals for television transmitter apparatus, without resorting to conventional step counters, a source of pulse signals drives a number, N, of interconnected binary multivibrators. A signal is generated upon the simultaneous occurrence of a predetermined energy state in the N multivibrators. The generated signal inhibits a predetermined number, *i*, of the N multivibrators and simultaneously initiates vertical retrace. The uninhibited multivibrators, $N-i$, continue to respond to the applied pulse signals until they again attain a predetermined energy state. Inhibition is thereupon terminated and all N multivibrators returned to their initial energy state. Vertical retrace is simultaneously terminated and the apparatus is thus prepared to generate a new vertical timing signal. Horizontal timing signals are developed simultaneously by divider apparatus responsive to the signals of the driving source.

BACKGROUND OF THE INVENTION

Field of the invention

This invention pertains to apparatus for generating control signals and, more particularly, to apparatus for generating control signals for video communications systems.

As is well known, the quality and accuracy of a reproduced video scene, at a receiver, is intimately related to the degree of correspondence between the relative physical positions of the scanning electronic beams at transmitter and receiver. It is, therefore, required that the periodicity and phase of the horizontal and vertical beam positioning control signal be substantially identical at both transmitter and receiver. The control signal, generally identified as a synchronizing (sync) signal, is usually composed of two parts, a horizontal (sync) timing signal and a vertical (sync) timing signal. An additional control signal is generally utilized, composed of two parts designated as horizontal blanking and vertical blanking, to blank out both the camera and receiver scanning beams during horizontal and vertical sweep retrace intervals. The general practice is to make the transmitter timing generator, which develops the above control signals, the fundamental timing unit of the entire system. Thus, the signals generated at the transmitter govern the scanning pattern at both transmitter and receiver. It is, therefore, imperative that the apparatus used to generate the transmitter timing signals be economical, highly accurate and reliable.

Description of the prior art

A commonly used scheme for generating timing or synchronizing signals utilizes a master oscillator having a signal frequency twice that of the desired line rate (horizontal frequency) and a plurality of divider circuits, responsive to the signals of the master oscillator, for reducing the generated signal frequency to the desired field rate (vertical frequency). In national network video systems, for example, a master oscillator signal frequency of 31.5 kilohertz (kHz.) is divided by two to yield a line rate of 15.75 kHz. and is also divided by a factor of 525 to develop a signal at a field rate of 60 Hz. The factor of 525 is selected because it is easily factored, itself, in small steps, since $525=7\times5\times5\times3$.

The desirability of small factors flows from the limitations of commonly used divider circuits known as "step counters." Since such counters rely on the incremental increase in charge of a capacitor with each applied pulse, there are severe practical limits on the size of the divisor which may be used. Thus, for particular applications, such as closed circuit television systems, where a non-divisible factor is required, e.g., the illustrative factor, 271, that is used in the following discussion, conventional step counters may not be used.

Alternatively, apparatus has been used wherein a delay line, responsive to the signals of a master oscillator, and appropriate gating circuits develop the desired horizontal timing signal. To generate the vertical timing signals, a system of binary dividers, interconnected with a plurality of feedback paths, is used to divide the signal frequency of the master oscillator in order to develop the desired field rate. A description of a typical system may be found on pages 528 to 532 of Pulse and Digital Circuits, authored by Millman and Taub (McGraw-Hill, 1956).

Of course, the use of delay lines and complex feedback circuitry is economically disadvantageous and introduces problems of maintenance and periodic adjustment which are severely detrimental in a system which must necessarily operate for extended intervals of time without mishap.

SUMMARY OF THE INVENTION

It is, therefore, an object of this invention to generate video timing signals without recourse to the use of step counters, delay lines and complex feedback circuitry.

It is another object of this invention to generate timing signals for video apparatus free of the limitations imposed by conventional divider circuits.

In accordance with the principles of this invention, these and other objects are accomplished by utilizing controlling logic circuitry and a plurality of binary counters, the number of which is intimately related to the number of lines per frame in a raster display. More particularly, a source of pulse signals drives a number, N, of interconnected binary multivibrators. A signal is generated upon the simultaneous occurrence of a predetermined energy state in the N multivibrators. The generated signal inhibits a predetermined number *i* of the N multivibrators and simultaneously initiates vertical retrace. The uninhibited multivibrators, $N-i$, continue to respond to the applied pulse signals until they again attain a predetermined energy state. As this juncture, inhibition is terminated and all N multivibrators are returned to their initial energy state. Vertical retrace is simultaneously terminated and the apparatus is prepared to initiate a new field. Thus, the total number of half lines in each field is $2^N-1$ active lines and $2^{N-i}$ retrace lines. Because of the mathematical relationship between the signal frequency of the driving pulse oscillator and the total number of lines per frame, proper interlace of the scanning signals is insured.

As another feature of this invention, a vertical sync pulse is utilized which endures for a predetermined interval of time, much less than the time allotted for vertical retrace. Accordingly, difficulties in transmitting extended pulse signals over conventional transmission lines are overcome.

Video systems quite often require that horizontal and vertical synchronizing signals be combined or mixed. In some systems, particularly useful in closed circuit television communications, the terminating portion of the vertical sync pulse, i.e., its trailing edge, is used as a trigger for the commencement of the vertical sweep of the beam of the receiver cathode ray display tube. Accordingly, to assure accurate synchronization, it is essential that the step marking the end of the vertical synchronizing pulse be detected as reliably and accurately as possible. Since a conventional mixing circuit simply combines vertical and horizontal sync pulses together, the trailing edge of a vertical pulse is not always discernible; it may be coincident in time with a horizontal pulse. In such an event, the vertical pulse appears elongated; thus, the phrase "edge ambiguity" and, as a result, the start of vertical sweep is proportionately delayed. This disadvantage is eliminated in the instant invention by utilizing an abbreviated vertical sync pulse interval which is selectively constructed to enclose a period of time equal to the reciprocal of twice the line frequency augmented by one horizontal timing pulse interval.

It is yet another feature of this invention that control signals are developed to inhibit the operation of automatic gain control circuitry.

The use of automatic gain control circuitry to adjust a television camera output signal in response to variations in scene brightness and general ambient lighting has become a necessity in sophisticated closed circuit television systems. Gain control circuitry, responsive to light sensitive devices, is not, however, without its disadvantages. It has been found, for example, that ceiling lights or reflections from bright objects, such as tie clasps, cause a false indication of scene brightness and thus improper operation of the gain control circuitry, resulting in a display picture, at a receiver, with insufficient contrast. This deleterious effect is substantially reduced, in accordance with the principles of this invention, by inhibiting the operation of the automatic control circuitry during the top and bottom quarter intervals of each field where these unwanted false highlights are most likely to occur.

Furthermore, it is often desirable, during interpersonal video communication, to transmit a "pattern" signal, in order to indicate that transmitter and receiver are functioning, where, for one reason or another, a display of the transmitter scene is not desired. Accordingly, the signals generated to inhibit the gain control circuitry during the top and bottom quarter of each field may also be transmitted to the receiver, in lieu of a video information signal, in order to develop a horizontal bar pattern, during the second and third quarter of each field, acoss the display screen.

These and further features and objects of this invention, its nature and various advantages will become apparent upon consideration of the attached drawings and of the following detailed description of the drawings.

DETAILED DESCRIPTION OF THE INVENTION

As is well known, the subjective advantages to be gained by the use of interlaced scanning well outweigh its disadvantages. It may be proper, at the outset, to define the timing relationships necessary to generate an interlaced raster. A complete picture or frame is created by scanning two fields, the odd lines in one field and the even lines in the next field. If $t_L$ corresponds to the period of the horizontal sweep and $t_F$ corresponds to the period of the vertical sweep, including retrace times, the swept beam must return to the same point on a display screen every $2t_F$ seconds, that is, every frame period. Therefore, $2t_F=nt_L$ where $n$ is the number of lines in the entire frame. Also, if the sweep is initiated at a predetermined point, the beam should be displaced half a horizontal sweep period away from the initial point in one field time if interlace is to occur. Thus, it is required that $$t_F=(m+\tfrac{1}{2})t_L$$

where $m$ is an integer. Combining these relationships, $n$ must be equal to $2m+1$, i.e., the number of lines in a frame must be an odd number or, alternatively, there must be an odd number of half lines in a field.

Figure 1:
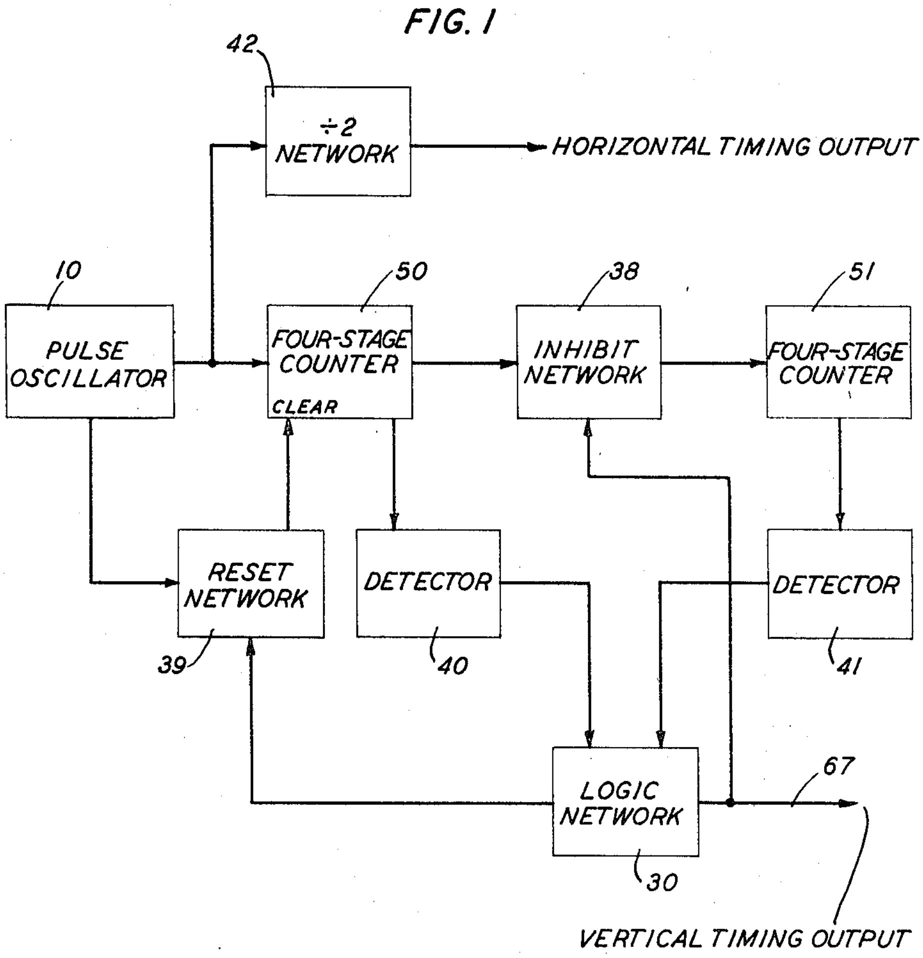
FIG. 1 is a block diagram of an illustrative embodiment of this invention.

FIG. 1 illustrates a simplified block diagram of the timing signal generator of this invention which incorporates these derived criteria. An oscillator 10, e.g., a multivibrator, generates pulse signals of a frequency twice that of the desired horizontal sweep frequency. These generated signals drive N stages of a binary counter which, for illustrative purposes and the following description, will be considered to comprise two four-stage counters 50 and 51 coupled by an inhibit network 38. Horizontal timing signals are derived via apparatus 42 which divides the signal frequency of oscillator 10 by a factor of two.

As discussed above, in order to achieve proper interlace of successive fields, the vertical sweep frequency $1/t_F$, i.e., the field rate, must be equal to twice the horizontal sweep frequency $1/t_L$, divided by the number, $n$, of lines per frame. For the present discussion, it will be assumed that the number of lines per frame is equal to 271; thus, it is necessary to divide the output signal frequency of oscillator 10 by a factor of 271 in order to obtain the desired vertical signal frequency. Of course, the principles of this invention are generally applicable and are not limited to the specific parameters presented for illustrative purposes.

Division is accomplished, while maintaning the proper interlace relationship, in accordance with this invention, by the cooperation of counters 50 and 51 and logic network 30. Assuming that inhibit network 38 is not enabled, i.e., not inhibiting, then the combined eight-stage counter, comprising counters 50 and 51, will respond to the output pulses of oscillator 10 in a normal fashion. If all the stages of the counters are reset, for example, to a predetermined LOW energy state, then, after the application of 255 pulses from oscillator 10, the eight N stages of the counter will have attained, e.g., a predetermined HIGH energy state. (The terms "LOW" and "HIGH" simply refer to the arbitrary designation of the potential of an output terminal of each of the counter stages.) Since the oscillator 10 signal frequency is twice that of the desired horizontal line frequency, 255 pulses will correspond to 127½ scanned lines. Thus, at this juncture, the beam of a vidicon, or other similar device (not shown), responsive to the generated horizontal timing signals of apparatus 42 will have scanned 127½ lines. Detectors 40 and 41 and logic network 30 respond to the HIGH energy condition of the combined counter by generating a vertical timing pulse, on line 67, which initiates vertical retrace. Simultaneously, the vertical timing pulse emanating from logic network 30 enables inhibit network 38 which open-circuits the conductive path connecting the four, $i$, stages of counter 51 to counter 50. Thus, the four, N—$i$, stages of counter 50 continue to respond to the output pulses of oscillator 10, while the four stages of counter 51 remain in their previous HIGH state. After sixteen pulses have been received by counter 50, each stage thereof will again have attained a HIGH energy state. This condition is detected by apparatus 40 which triggers logic network 30, terminating the vertical timing pulse and initiating active vertical sweep once again. Thus, after an additional sixteen pulses from oscillator 10, corresponding to eight scanned lines, a field will have been completed comprising a total of 127½ active scanned lines and eight retrace lines.

To commence the second field of the frame, reset network 39, which is activated by logic network 30 at the termination of the vertical timing pulse, detects the next change in phase of the output signal of oscillator 10. Since only every other change in phase of the pulse output of oscillator 10 activates counter 50, sufficient time is allowed for apparatus 39 to activate the "clear" input of the first stage of counter 50. At the termination of the vertical timing pulse inhibit network 38 is disabled; thus, since both counters, 50 and 51, are in a HIGH state, the combined eight stages will be reset to a LOW state by activation of the "clear" input of the first stage of counter 50. Accordingly, the counters are returned to their initial state to commence the second field of the frame in an identical manner to that described above. A full frame will thus comprise 255 (2 x 127½) active scan lines and 16 (2 x 8) retrace lines yielding a total of 271 lines per frame, which are properly interlaced.

If so desired, the frequency of the vertical timing pulses emanating from logic network 30 may be compared with the signal frequency of a standard source in a comparator of any well-known type. The error signal, if any, developed by the comparator, is used to adjust the frequency of oscillator 10 to insure correspondence with the desired standard.

Figure 2:
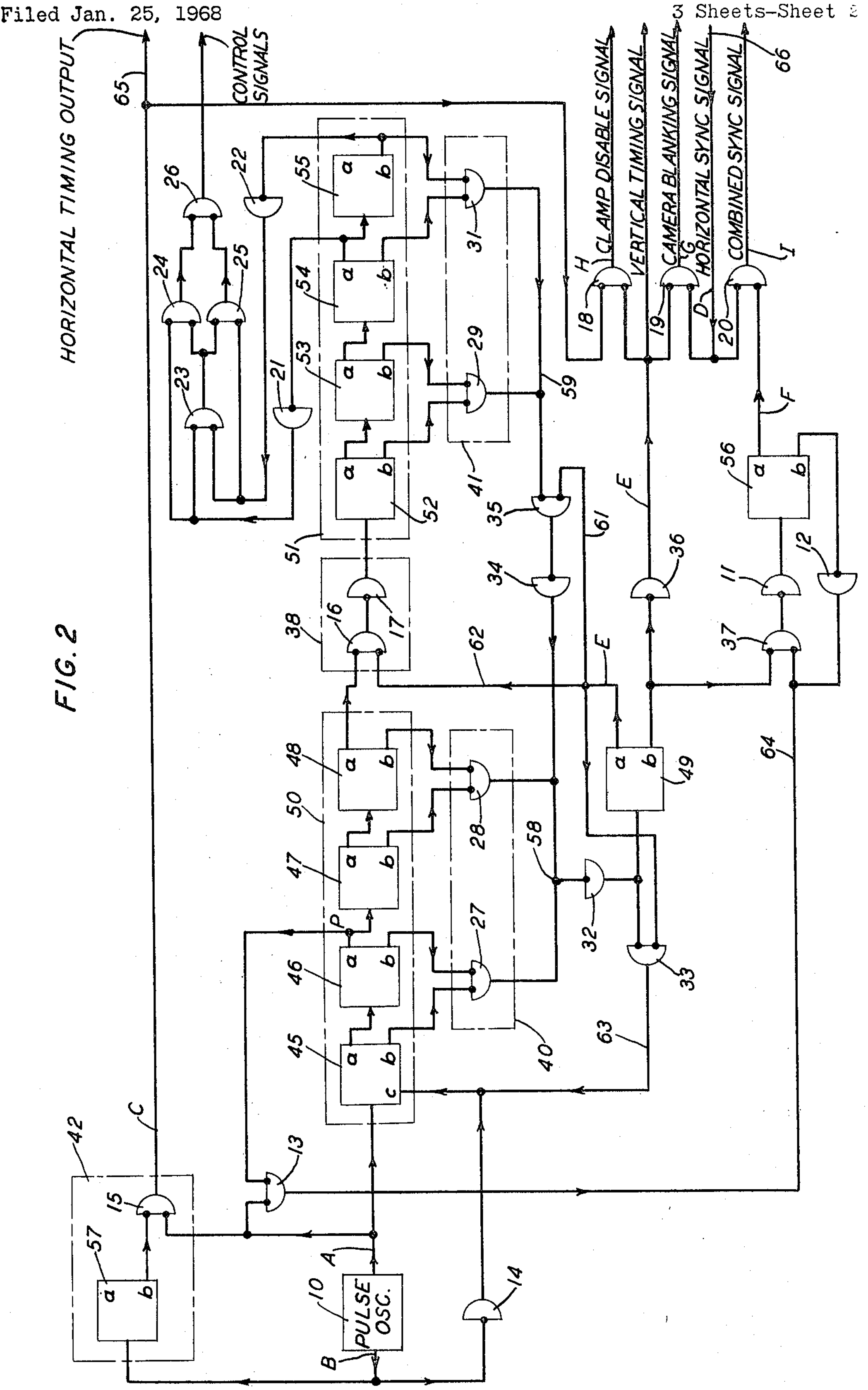
FIG. 2 is a detailed block diagram of the timing generator of this invention.

FIG. 2 depicts the signal timing generator of this invention in more detail; explanation of the operation of the generator may be facilitated by first associating some of its diverse components with the functional blocks of FIG. 1. Four binary multivibrators, 45, 46, 47 and 48, corresponding to four-stage counter 50, are coupled via transmission gates 16 and 17, i.e., inhibit network 38, to four more binary multivibrators, 52, 53, 54 and 55, which correspond to four-stage counter 51. Detectors 40 and 41 are each represented by a pair of transmission gates 27, 28 and 29, 31, respectively. Finally, binary multivibrator 57 and transmission gate 15 function as divider network 42.

For the purposes of this discussion, the following illustrative parameters will be assumed:

$$\frac{1}{t_F}=\text{field rate}=60\text{ Hz.}=\frac{2}{nt_L}$$

$n=\#$ lines per frame=271;

$$\frac{1}{t_L}=\text{line frequency}=8130\text{ Hz.}$$

and $$\frac{1}{2t_F}=\text{frame rate}=30\text{ Hz.}$$

Figure 4:
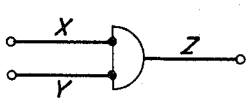
FIG. 4 shows a typical transmission gate used in this invention and illustrates the logical relationship between its input signals and output signals.
Figure 3:
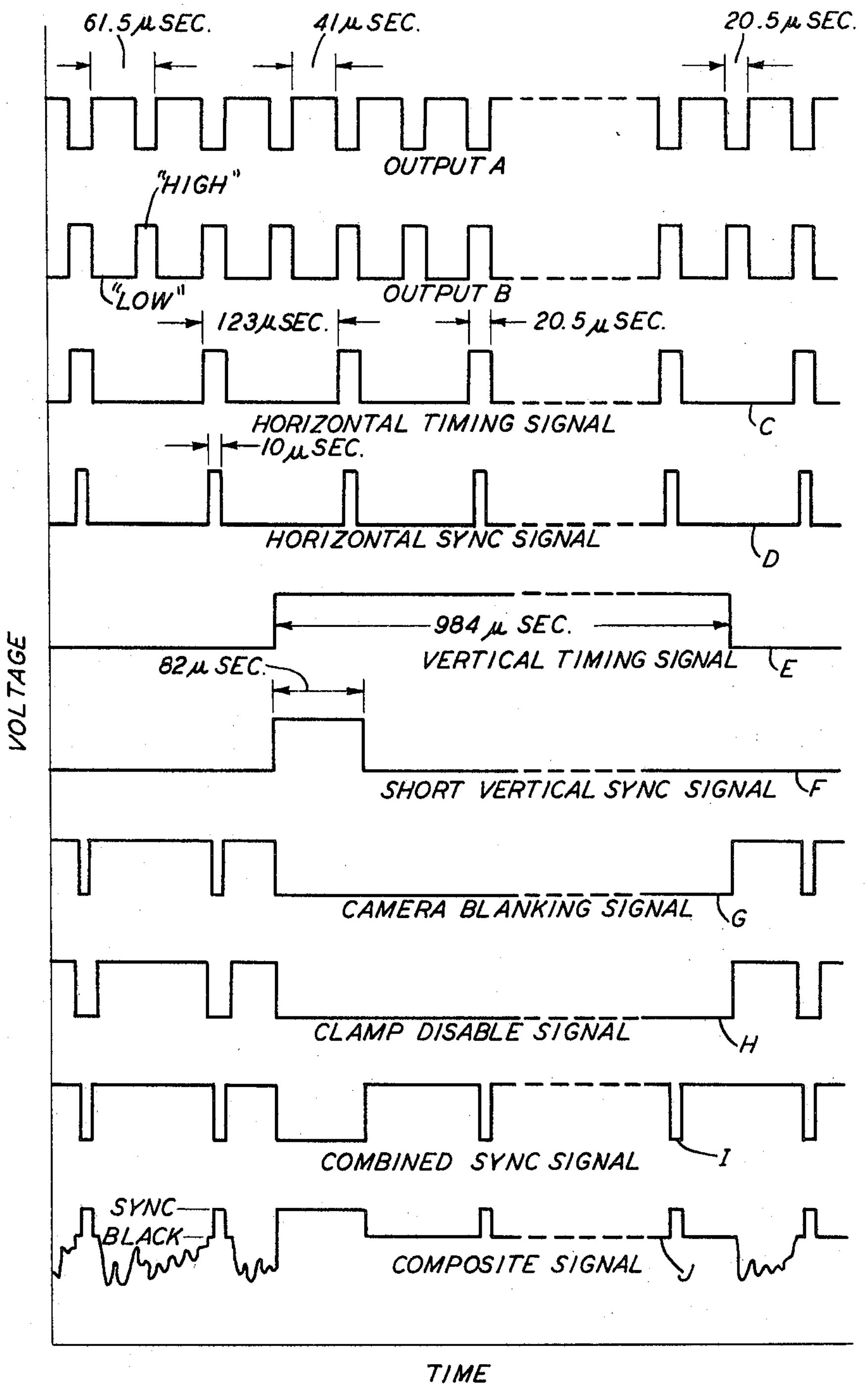
FIG. 3 depicts various signal waveforms generated by the apparatus of this invention.

Various waveforms of the timing signals generated by the apparatus of FIG. 2 are shown in FIG. 3. In addition, the logical relationship between the input signals of a typical transmission gate, used in the apparatus to be described, and its output signals is apparent from FIG. 4. In compliance with well accepted terminology, "LOW" and "HIGH" are arbitrary specifications of the potential of a designated conductor or signal.

Pulse oscillator 10, preferably a multivibrator, develops two output signals, illustrated by waveforms A and B of FIG. 3, having a frequency of 16.26 kHz. (kilohertz), corresponding to twice the line frequency. It may be noted from FIG. 3 that waveforms A and B are 180° out of phase and that each waveform is non-symmetrical. The 61.5 microsecond (μsec.) period of output waveform A is divided into a 20.5 μsec. LOW interval and a 41 μsec. HIGH interval; the inverse is, of course, true for waveform B. The advantages flowing from the use of inverse and non-symmetrical waveforms will become apparent hereinafter.

Output waveform A is applied to the first stage, i.e., multivibrator 45, of counter 50. In a manner well known to those skilled in the art, each stage assumes a different energy state as the train of pulses proceeds through the eight stages of counters 50 and 51. When the indicated *a* terminal outputs of multivibrators 45 and 46 attain a HIGH state, then, necessarily, the *b* terminal outputs are in a LOW state. Thus, the output of gate 27 is HIGH since both applied input signals are LOW. However, if we assume that the *a* terminal outputs of multivibrators 47 and 48 have not yet attained a HIGH state, the output of gate 28 will remain LOW and therefore constrain the output of gate 27. When multivibrators 47 and 48 do change their energy state, junction 58 will become HIGH if not constrained by the output of gate 34. Gate 34 is responsive, via gate 35, to the output signals of gate 29 and 31, which function in a manner identical to that of gates 27 and 28, and to the *a* terminal output of multivibrator 49. Generally, except during the vertical retrace period, the terminal *a* output of multivibrator 49 is LOW. Thus, if the terminal *a* outputs of multivibrators 52, 53, 54 and 55 are not all in a HIGH state, line 59, and line 61 during active vertical sweep, will be LOW, resulting in a HIGH output from gate 35 and a LOW output from gate 34 which constrains junction 58. If, however, all eight terminal *a* outputs of the counter are in a HIGH state, then the output of gate 35 will be LOW, since its input comprises a HIGH signal and a LOW signal, and the output of gate 34 is thus HIGH. Therefore, for this condition of the counter and multivibrator 49, the output of gate 32 will be LOW.

Parenthetically, if by inadvertence terminal *a* of multivibrator 49 is in a HIGH state, then the output of gate 32 will be LOW when the first four stages, 45, 46, 47 and 48 have HIGH terminal *a* outputs. Since a LOW output of gate 32 triggers multivibrator 49, lockout of multivibrator 49 is prevented if it comes on in a HIGH terminal *a* state when power is first turned on and the first four stages 45, 46, 47, 48 are not immediately in a HIGH terminal *a* state. Multivibrator 49 will thus reassume its normal state during the active vertical sweep period and the sequence of operations will continue as described above.

Returning to the initial discussion, the LOW signal output of gate 32 flips multivibrator 49 from a HIGH terminal *b* output to a HIGH terminal *a* output, after 255 pulses have been applied to the combined eight-stage counter, thereby initiating vertical retrace. The total time allotted for active scanning is thus 15.6825 μsec. (255×61.5 μsec.). The vertical timing pulse, waveform E, is thus initiated when the terminal *a* output of multivibrator 49 becomes HIGH. The same pulse is also conveyed to inhibit gate 16 via line 62. The presence of a second HIGH input at gate 16 necessarily develops a LOW input at gate 17 with a resultant HIGH signal applied to multivibrator 52. Since only a LOW signal will trigger multivibrator 52, the last four stages 52, 53, 54 and 55 of the combined counter are effectively inhibited during the duration of a HIGH signal on line 62. Terminal *a* of multivibrator 49 will remain HIGH until the multivibrator is triggered by a LOW signal. Of course, since pulses are being continually applied to multivibrator 45, the four stages of counter 50 continue to respond in a normal fashion. Multivibrator 49 will not change state until the terminal *a* outputs of stages 45, 46, 47 and 48 again reach a HIGH state. Since this condition will not be satisfied until after 16 pulses have been applied by oscillator 10 to multivibrator 45, the total time allowed for vertical retrace is 984 μsec. (16×61.5 μsec.).

When multivibrator 49 changes state, both inputs to gate 33 are LOW. Before the next LOW pulse from oscillator 10 flips multivibrator 45, a HIGH signal, which lasts for 41 μsec., is present at output A of oscillator 10. Thus, output waveform B, as shown in FIG. 3, is LOW and the output of gate 14 HIGH, as is the output of gate 33. Accordingly, multivibrator 45 will be "cleared" by this HIGH input and since all counters are in the same state and gate 16 is no longer inhibited by a HIGH signal on line 62, the clearing of stage 45 will, in a normal fashion, clear the remaining stages. Thus, an additional pulse will be "stuffed" into the counter after a total count of 271 (255 active scan pulses and 16 retrace pulses) resetting the terminal *a* outputs of the counter chain to a LOW state to begin a new field. The same sequence of events is thus repeated, time and again, to generate a series of accurately timed signals for each successive field.

The vertical timing pulse, waveform E of FIG. 3, developed at the terminal *a* output of multivibrator 49 is also available at the output of gate 36 which simply inverts the complement of the terminal *a* output. As noted above, the vertical timing signal is in a HIGH state for 984 $\mu$sec. Since it is difficult to maintain a signal of this duration over ordinary transmission facilities without some degradation in amplitude and frequent content, it is a feature of this invention that a shortened or abbreviated pulse of a predetermined interval is utilized for synchronization in place of the extended duration pulse. As indicated by waveform F of FIG. 3, the shortened vertical synchronization (sync) pulse is selectively constructed to endure for a total of 82 $\mu$sec., one period of the signal frequency of oscillator 10, i.e., 61.5 $\mu$sec., and one horizontal timing pulse interval (20.5 $\mu$sec.). Accordingly, the shortened vertical sync pulse will contain a horizontal timing pulse which coincides with its leading edge in one field and its trailing edge in the next succeeding field, due to the time differential between successive interleaved fields. Thus, the mixing or combination of horizontal and vertical sync pulses will not have the effect of developing "edge ambiguity."

In some video systems, particularly useful in closed circuit television communications, the terminating portion of the vertical sync pulse, i.e., its trailing edge, is used as a trigger for the commencement of the vertical sweep of the beam in the receiver cathode ray display tube. Accordingly, to assure accurate synchronization, it is essential that the step marking the end of the vertical synchronizating pulse be detected as reliably and accurately as possible. Since a conventional mixing circuit simply combines vertical and horizontal sync pulses together, the trailing edge of a vertical pulse is not always discernible; it may be coincident in time with a horizontal pulse. In such an event, the vertical pulse appears elongated; thus the phrase "edge ambiguity" and, as a result, the start of the vertical sweep is proportionately delayed.

The shortened vertical pulse used in this invention, is developed at the terminal *a* output of multivibrator 56. During the active vertical trace period, the terminal *b* output of multivibrator 56 is in a HIGH state. Thus, line 64 is constrained to a LOW level since gate 12 inverts the HIGH terminal *b* output of multivibrator 56. Also, since the terminal *b* output of multivibrator 49, one of the inputs to gate 37 is HIGH and line 64 is LOW, the input of multivibrator 56 is HIGH due to the inversion introduced by gate 11. When multivibrator 49 is triggered to start vertical retrace, the terminal *b* output thereof becomes LOW and, necessarily, so does the input to multivibrator 56. A LOW input signal flips multivibrator 56 with the result that the terminal *a* output of multivibrator 56 becomes HIGH. Thus, the shortened vertical pulse is initiated at the same time the vertical timing pulse, at the output of multivibrator 49, is commenced. Line 64 tends to go HIGH since gate 12 will simply invert the LOW terminal *b* output of multivibrator 56. However, line 64 is also connected to the output of gate 13. Since one of the inputs to gate 13 is the terminal *a* output of multivibrator 46, which is HIGH at this time because all terminal *a* outputs are in a HIGH state at the commencement of vertical retrace, line 64 will be constrained to a LOW state by gate 13. After the elapse of 20.5 $\mu$sec., the signal A output of oscillator 10 becomes HIGH; thus the output of gate 13 is maintained LOW. After an additional 41 $\mu$sec., output signal A of oscillator 10 becomes LOW and immediately thereafter, normal counter action causes the terminal *a* output of multivibrator 46 to become LOW. Thus, 61.5 $\mu$sec., after retrace is started, line 64 becomes HIGH, since both inputs to gate 13 are LOW, and the input to gate 12 is LOW. The terminal *b* output of multivibrator 49 remains LOW and therefore the input to multivibrator 56 becomes HIGH. Since only a LOW signal triggers the multivibrator, the output of multivibrator 56 is not affected. After a further additional interval of 20.5 $\mu$sec., output signal A of oscillator 10 becomes HIGH, causing line 64 to again become LOW and since the terminal *b* output of multivibrator 49 is still LOW, the input to multivibrator 56 is also LOW. Thus, multivibrator 56 is flipped after a total elapsed time of 82 $\mu$sec., terminating the shortened vertical pulse, as depicted by waveform F of FIG. 3. Since gate 12 will maintain line 64 in a LOW state, multivibrator 56 is rendered insensitive until the terminal *b* output of multivibrator 49 becomes HIGH and then LOW again at the start of another vertical retrace period.

Horizontal timing signals are generated by pulse oscillator 10 in conjunction with multivibrator 57 and gate 15. Assuming that at an arbitrarily chosen reference time, the signal A output of oscillator 10 is LOW and that the terminal *b* output of multivibrator 57 is also LOW, then the output of gate 15 will be HIGH. The next change in phase of output signal A will be a HIGH level; thus, output signal B attains a LOW level and multivibrator 57 is flipped. Multivibrator 57 will not change state again until output A becomes HIGH again and thus output B LOW. Following the attainment of a HIGH state by output signal A, the next change in phase of signal A will cause a coincidence of two LOW input signals at gate 15; thus, the output of gate 15 will be HIGH. It is therefore apparent that alternate LOW phases of the A output signal of oscillator 10 create 20.5 $\mu$sec. positive going horizontal timing pulses, waveform C, every 123 $\mu$sec., i.e., at the desired horizontal timing interval, $t_L$.

It may be desirable to use a horizontal timing pulse for synchronization which has a duration somewhat smaller than the duration of the generated horizontal timing pulses in order to minimize "edge effect." This phenomenon is caused by leakage from unscanned elements of the camera tube over to the border elements of the scanned area. By utilizing a shorter timing pulse for synchronization, e.g., 10 $\mu$sec. in duration, the picture information of these border elements is not transmitted since the video output is disabled for the full horizontal timing interval, as discussed below. Accordingly, the horizontal timing signals at the output of gate 15 may be conveyed via line 65 to a sync tip generator (not shown), of any well-known construction, which develops a train of horizontal sync pulses represented by waveform D of FIG. 3. It is noted that the sync pulses are enclosed within the timing interval of the horizontal timing pulses of waveform C. The generated sync pulses are returned to the apparatus of FIG. 2 by line 66 where they are combined with the other timing signals in a manner discussed below.

The various timing signals are combined in gates 18 to 20, inclusive, to develop the signals required for various portions of the camera circuitry. In order to facilitate a lucid explanation of the invention and avoid unnecessary complexity, the camera and its associated circuitry, which may be of conventional construction, are not illustrated nor discussed in detail.

The horizontal timing signal appearing on line 65, is combined with the vertical timing signal in gate 18 to develop a clamp disable signal (waveform H). During each clamp disable timing interval, the video transmission path is interrupted and the output signal of the camera attains a "black" level.

As mentioned above, the horizontal timing signals of gate 15 may be applied via line 65 to a sync tip generator (not shown), to develop the horizontal sync pulses, shown in waveform D of FIG. 3. Of course, the horizontal timing signals may be used without alteration, if so desired. Assuming that an auxiliary sync tip generator is utilized, the sync pulses appear on line 66. The horizontal sync pulsetrain, wave form D, is used to drive the camera horizontal sweep circuitry and is also combined in gate 19 with the vertical timing signal, waveform E, to develop a blanking signal, waveform G, for the camera during horizontal and vertical retrace intervals. One advantage of using horizontal sync pulses of a duration shorter than the timing pulses for horizontal sync and blanking is that the shorter duration sync pulses are enclosed within the timing interval of the horizontal timing pulses. Since the output of the camera is disabled for the full horizontal timing interval, the picture information of the border elements surrounding the shorter horizontal blanking interval are not transmitted and the phenomenon of "edge effect" is considerably reduced.

The combined sync signal, waveform I, is developed by gate 20 in response to the horizontal sync pulses of line 66 and the shortened vertical sync pulse appearing at the output of multivibrator 56.

A composite video-sync signal developed by conventional apparatus (not shown), is illustrated by waveform J.

The use of automatic gain control circuitry to adjust a television camera output signal in response to variations in scene brightness and general ambient lighting has become a necessity in sophisticated closed circuit television systems. Gain control circuitry, responsive to light sensitive devices, is not, however, without its disadvantages. It has been found, for example, that ceiling lights or reflections from bright objects such as tie clasps, cause a false indication of scene brightness and thus improper operation of the gain control circuitry, resulting in a display picture, at a receiver, with insufficient contrast. This deleterious effect may be substantially reduced, in accordance with the principles of this invention, by inhibiting the operation of the automatic control circuitry during the top and bottom quarter intervals of each field where these unwanted false highlights are most likely to occur.

Furthermore, it is often desirable during interpersonal video communications to transmit a "pattern" signal, in order to indicate that transmitter and receiver are functioning, where, for one reason or another, a display of the transmitter scene is not desired. Accordingly, the signals generated to inhibit the gain control circuitry during the top and bottom quarter of each field may also be transmitted to the receiver, in lieu of the normal video signal, in order to develop a horizontal bar pattern, during the second and third quarter of each field, across the display screen.

The inhibit or "pattern" control signals are developed, in accordance with this invention, by gates 21 to 26, inclusive, in cooperation with multivibrators 54 and 55. Responsive control circuitry is not shown and may be of any well-known type. The terminal *a* output of multivibrator 54 is LOW for the first and third quarters of each field interval and HIGH for the second and fourth quarters. Similarly, the terminal *b* output of multivibrator 55 is HIGH for the top half of each field interval and LOW for the bottom half of each field interval. Gates 21 and 22, responsive, respectively, to the indicated signal outputs of multivibrators 54 and 55, serve as expanders and simply invert the applied signals. The output of gate 23 is thus LOW during the first, third and fourth quarters of each field interval. Since gate 24 is responsive to the inverted output of multivibrator 55, and to the output of gate 23, the output of gate 24 is LOW during the first, second and third quarters, while similarly, the output of gate 25 is LOW during the second, third and fourth quarters of each field interval. The coincidence of two LOW signals, at the input of gate 26, will thus only occur during the second and third quarter of each field period. Accordingly, the output of gate 26 is HIGH during the second and third quarters of each field and LOW during the first and fourth periods. Thus, the output signal of gate 26 may be used to inhibit during the first (top) and fourth (bottom) quarters of each field period.

It is to be understood that the embodiments shown and described herein are illustrative of the principles of this invention only, and that modifications of this invention may be implemented by those skilled in the art without departing from the scope and spirit of the invention. For example, the apparatus described in conventional discrete circuit component terminology may also lend itself to implementation by integrated circuit technology.

What is claimed is:

1. Apparatus for generating video timing signals comprising:
   - a source of periodic timing pulses,
   - counter means comprising a predetermined number, N, of stages responsive to said timing pulses,
   - means for generating a first signal upon the simultaneous occurrence of a first predetermined energy state in the N stages of said counter means,
   - means responsive to said first signal for inhibiting a predetermined number, *i*, stages of said N stage counter means,
   - means for generating a second signal upon the simultaneous occurrence of a predetermined energy state in the $N-i$ uninhibited stages of said counter means,
   - means responsive to said second signal for extinguishing said first signal, said extinguishment simultaneously terminating the inhibition of said *i* stages of said counter means, and
   - means responsive to said second signal for simultaneously establishing a second predetermined energy state in the N stages of said counter means.

2. Apparatus for generating video timing signals comprising:
   - a source of periodic timing pulses,
   - first counter means, comprising a predetermined number of binary stages, responsive to said timing pulses,
   - second counter means comprising a predetermined number of binary stages conductively coupled to said first counter means,
   - means for generating a vertical timing signal upon the simultaneous occurrence of a first predetermined energy state in the combined stages of said first and second counter means,
   - inhibit network means, responsive to said vertical timing signal, for disabling the conductive path between said first and second counter means upon the occurrence of said vertical timing signal,
   - means for generating a control signal upon the simultaneous occurrence of a predetermined energy state in the stages of said first counter means,
   - means responsive to said control signal for terminating said vertical timing signal,
   - means responsive to said control signal for simultaneously establishing a second predetermined energy state in the combined stages of said first and second counter means, and
   - means responsive to said periodic timing pulses for dividing the signal frequency of said timing pulses by a factor of two to develop a horizontal timing signal.

3. The apparatus as defined in claim 2 further comprising:
   - means responsive to the signals of a predetermined number of stages of said second counter means for developing control signals at preselected intervals of time between the occurrences of said vertical timing signal.

4. The apparatus as defined in claim 2 wherein said means for generating a vertical timing signal comprises:
   - detection means for developing a first signal when the binary stages of said first and second counter means attain a first predetermined energy state, and first multivibrator means responsive to said first signal for developing a vertical timing pulse.

5. The apparatus as defined in claim 4 further comprising:

second multivibrator means for developing an abbreviated vertical sync pulse having a predetermined duration less than that of said vertical timing pulse, and logic circuitry responsive to said periodic timing pulses, said vertical timing pulse and said first counter means for selectively actuating said second multivibrator means.

6. Apparatus for generating television timing signals comprising:

oscillator means for developing a continuous train of pulse signals having a frequency equal to twice a predetermined horizontal scanning frequency, counter means comprising N binary stages responsive to the pulse signals of said oscillator means, means for generating a first signal upon the simultaneous occurrence of a predetermined energy state in the N stages of said counter means, means responsive to said first signal for initiating a vertical timing pulse, means responsive to said vertical timing pulse for inhibiting the last *i* stages of said counter means, means for generating a second signal upon the simultaneous occurrence of a first predetermined energy state in the first $N-i$ uninhibited stages of said counter means, means responsive to said second signal for terminating said vertical timing pulse thereby simultaneously enabling said last *i* stages of said counter means, means responsive to said second signal and said vertical timing pulse for establishing a second predetermined energy state in the N stages of said counter means upon the termination of said vertical timing pulse, means responsive to the pulse signals of said oscillator means for developing a train of horizontal timing pulses, means responsive to said vertical timing pulse, said oscillator pulse signals, and the signals developed by a predetermined binary stage of said counter means for developing a vertical sync pulse having a duration substantially less than said vertical timing pulse and equal to half the reciprocal of said horizontal scanning frequency augmented by one horizontal timing pulse interval, means responsive to the signals of two preselected stages of counter means for developing control signals at predetermined intervals of time between the termination of one vertical timing pulse and the initiation of another, and means responsive to said horizontal timing pulses and said vertical timing and vertical sync pulses for selectively combining said pulse signals.

7. The apparatus defined in claim 6 wherein said pulse train developed by said oscillator means comprises alternate HIGH and LOW levels having preselected durations differing from one another, one of said levels corresponding to a predetermined horizontal timing pulse interval.

8. Apparatus for generating television timing signals comprising:

oscillator means for developing a continuous train of pulse signals having a frequency equal to twice a predetermined horizontal scanning frequency, counter means comprising N binary stages responsive to the pulse signals of said oscillator means, means for generating a first signal upon the simultaneous occurrence of a first predetermined energy state in the N stages of said counter means, means responsive to said first signal for initiating a vertical timing pulse, means responsive to said vertical timing pulse for inhibiting the last *i* stages of said counter means, means for generating a second signal upon the simultaneous occurrence of a predetermined energy state in the first $N-i$ uninhibited stages of said counter means, means responsive to said second signal for terminating said vertical timing pulse thereby simultaneously enabling said last *i* stages of said counter means, means responsive to said second signal and said vertical timing pulse for establishing a second predetermined energy state in the N stages of said counter means upon the termination of said vertical timing pulse, means responsive to the pulse signals of said oscillator means for developing a train of horizontal timing pulses, and means responsive to said vertical timing pulse, said oscillator pulse signals and the signals developed by a predetermined binary stage of said counter means for developing a vertical sync pulse having a duration substantially less than said vertical timing pulse.

9. Apparatus for generating television field timing signals comprising:

oscillator means for developing a continuous train of pulse signals, counter means having a plurality of binary stages responsive to the pulse signals of said oscillator means, detection means for generating a first signal upon the simultaneous occurrence of a first predetermined energy state in the stages of said counter means, means responsive to said first signal for developing a vertical timing pulse, means responsive to said vertical timing pulse for inhibiting a predetermined number of the stages of said counter means, said detection means generating a second signal upon the simultaneous occurrence of a predetermined energy state in the uninhibited stages of said counter means, means responsive to said second signal for terminating said vertical timing pulse thereby simultaneously enabling said inhibited stages of said counter means, means responsive to said second signal and said vertical timing pulse for establishing a second predetermined energy state in all the stages of said counter means upon the termination of said vertical timing pulse, and means responsive to said vertical timing pulse, said oscillator pulse signals and the signals developed by a predetermined binary stage of said counter means for developing a vertical sync pulse having a duration substantially less than said vertical timing pulse.

References Cited

UNITED STATES PATENTS 2,752,424 6/1956 Pugsley.
2,771,507 11/1956 Levine et al.

RICHARD MURRAY, Primary Examiner